US011912213B2

(12) United States Patent
Van Beek et al.

(10) Patent No.: US 11,912,213 B2
(45) Date of Patent: Feb. 27, 2024

(54) DISCHARGE DEVICE FOR VEHICLE WASTEWATER MANAGEMENT SYSTEM

(71) Applicant: THETFORD BV, Etten-Leur (NL)

(72) Inventors: Jacco Van Beek, Breda (NL); Joop Van Leeuwen, Zundert (NL); Tijs Slezak, Breda (NL); Wilco Wessels, Ulvenhout (NL); Ruud Van Den Heijkant, Teteringen (NL); Ronald Van Der Hoeven, The Hague (NL); Mark Mulders, Breda (NL); Tom Kieboom, Dordrecht (NL); Didier Van Riel, Breda (NL); Mitchell Van De Sande, Tilburg (NL); Dineke Van Duijn, Etten-Leur (NL)

(73) Assignee: Thetford BV, Etten-Leur (NL)

(*) Notice: Subject to any disclaimer, the term of this patent is extended or adjusted under 35 U.S.C. 154(b) by 249 days.

(21) Appl. No.: 17/102,946

(22) Filed: Nov. 24, 2020

(65) Prior Publication Data

US 2021/0078509 A1 Mar. 18, 2021

Related U.S. Application Data

(63) Continuation of application No. 15/968,132, filed on May 1, 2018, now Pat. No. 11,351,935.

(51) Int. Cl.
*B60R 15/04* (2006.01)
*E03D 9/10* (2006.01)
(Continued)

(52) U.S. Cl.
CPC ............ *B60R 15/04* (2013.01); *B61D 35/007* (2013.01); *B63B 29/14* (2013.01); *C02F 1/001* (2013.01); *E03D 9/10* (2013.01); *C02F 2103/002* (2013.01); *C02F 2103/005* (2013.01); *C02F 2201/005* (2013.01); *C02F 2209/40* (2013.01);
(Continued)

(58) Field of Classification Search
None
See application file for complete search history.

(56) References Cited

U.S. PATENT DOCUMENTS 2,556,221 A * 6/1951 Samiran ................. B64D 37/20
137/413
2,653,832 A * 9/1953 Carter ....................... B64F 1/28
141/346

(Continued)

FOREIGN PATENT DOCUMENTS

WO 2004039638 A2 5/2004

OTHER PUBLICATIONS

European Search Report for corresponding European Application No. EP9196076.4, dated Dec. 13, 2019.

(Continued)

*Primary Examiner* — Robert J Popovics
(74) *Attorney, Agent, or Firm* — Harness, Dickey & Pierce, P.L.C.; Stephen T. Olson

(57) ABSTRACT

An apparatus for delivering wastewater from a recreational vehicle to a drain includes a housing having an outer wall and an inner wall generally perpendicular or slightly angled to the outer wall. The housing and the inner wall define an inlet chamber above the inner wall and a further chamber below the inner wall. The housing further includes an outlet downwardly extending from the inlet chamber.

4 Claims, 11 Drawing Sheets

(51) Int. Cl.
  *B63B 29/14* (2006.01)
  *B61D 35/00* (2006.01)
  *C02F 1/00* (2023.01)
  *C02F 103/00* (2006.01)

(52) U.S. Cl.
  CPC ...... C02F 2303/16 (2013.01); C02F 2303/26 (2013.01)

(56) References Cited

U.S. PATENT DOCUMENTS

| | | | | |
|---|---|---|---|---|
| 2,669,416 A * | 2/1954 | Hilton | F16K 3/316 | 251/156 |
| 2,679,407 A * | 5/1954 | Badger, Jr. | B65B 39/00 | 251/89.5 |
| 2,806,741 A * | 9/1957 | Fishelson | B05B 1/3073 | 239/456 |
| 3,069,127 A * | 12/1962 | Perry | F16L 37/23 | 251/149.9 |
| 3,295,553 A * | 1/1967 | Garrett | B64D 39/06 | 285/27 |
| 3,474,827 A * | 10/1969 | Rosell | F16L 37/36 | 137/614.03 |
| 3,529,630 A * | 9/1970 | Podolsky | F16K 1/44 | 137/630.14 |
| 3,606,244 A * | 9/1971 | Nusbaum | F16L 37/47 | 285/1 |
| D227,883 S * | 7/1973 | Huthsing, Jr. | D23/231 | |
| 4,135,551 A * | 1/1979 | Knight | F16L 37/127 | 251/149.9 |
| 4,223,702 A * | 9/1980 | Cook | F16L 7/00 | 138/155 |
| 4,234,161 A * | 11/1980 | Wilder | F16L 37/1205 | 74/105 |
| 4,275,866 A * | 6/1981 | Jamar | F16K 3/0254 | 251/329 |
| 4,359,066 A * | 11/1982 | Hunt | F16L 37/36 | 251/149.9 |
| 4,550,453 A * | 11/1985 | Norman | E03F 1/008 | 4/321 |
| 4,567,924 A * | 2/1986 | Brown | F16L 55/1007 | 137/802 |
| 4,590,969 A * | 5/1986 | Sirois | F16K 31/44 | 251/319 |
| 4,638,842 A * | 1/1987 | Hawley | B67D 7/42 | 141/348 |
| 4,844,121 A * | 7/1989 | Duke | E03F 1/008 | 285/298 |
| 4,919,174 A * | 4/1990 | Warland | B67D 7/46 | 141/226 |
| 5,023,959 A * | 6/1991 | Mercer | E03F 1/00 | 4/321 |
| 5,078,180 A * | 1/1992 | Collins | B60R 15/00 | 251/30.05 |
| 5,247,974 A * | 9/1993 | Sargent | F16L 17/10 | 285/97 |
| 5,382,389 A * | 1/1995 | Goodine | B01F 25/31112 | 261/78.2 |
| 5,404,909 A * | 4/1995 | Hanson | F16L 37/252 | 62/50.7 |
| 5,405,120 A * | 4/1995 | Kerpan | F16L 37/44 | 251/143 |
| 5,433,163 A * | 7/1995 | McKiernan | B63B 13/00 | 285/332 |
| 5,535,984 A * | 7/1996 | Anderson | F16L 37/20 | 251/149.9 |
| 5,653,262 A * | 8/1997 | Hanemaayer | B60R 15/00 | 137/355.16 |
| 5,725,034 A * | 3/1998 | Fry | F17C 5/02 | 141/354 |
| 5,904,302 A * | 5/1999 | Brown | B64F 1/28 | 141/386 |
| 5,915,411 A * | 6/1999 | Gilbert | E03F 1/008 | 251/368 |
| 5,947,156 A * | 9/1999 | Tomczyk | E03F 1/00 | 137/355.16 |
| 5,988,221 A * | 11/1999 | Walker | E03F 1/008 | 137/899 |
| 6,352,088 B1 * | 3/2002 | Stegall | B60R 15/00 | 141/1 |
| 6,354,320 B1 * | 3/2002 | Kolacz | B05B 12/08 | 239/587.2 |
| 6,378,555 B2 * | 4/2002 | Kyle | F16L 37/46 | 137/613 |
| 6,427,715 B1 * | 8/2002 | Brockington | F16L 45/00 | 137/239 |
| 6,446,845 B1 * | 9/2002 | Steiger | B67D 3/043 | 222/509 |
| 6,505,861 B2 * | 1/2003 | Butterfield | F16L 27/08 | 285/275 |
| 6,543,484 B1 * | 4/2003 | Highsmith | E03F 1/008 | 137/355.2 |
| 6,626,419 B2 * | 9/2003 | deCler | B67D 3/045 | 251/345 |
| 6,705,550 B2 * | 3/2004 | Bell | B67D 7/54 | 239/533.1 |
| 6,802,343 B2 * | 10/2004 | Faahs | E03F 1/00 | 137/355.16 |
| 6,887,372 B2 * | 5/2005 | Streicher | B01D 29/668 | 210/411 |
| 6,957,668 B1 * | 10/2005 | Highsmith | B65H 75/4486 | 137/355.2 |
| 7,144,046 B1 * | 12/2006 | Lape, Sr. | F16L 25/065 | 285/180 |
| 7,156,574 B1 * | 1/2007 | Garst | B60R 15/00 | 137/181 |
| 7,195,181 B2 * | 3/2007 | Steingass | B05B 1/304 | 239/456 |
| 7,588,060 B2 * | 9/2009 | Ballard | B67D 7/44 | 239/533.1 |
| D613,826 S * | 4/2010 | Hall | D23/259 | |
| 7,722,091 B1 * | 5/2010 | Brockington | E03F 1/008 | 285/361 |
| 7,823,801 B2 * | 11/2010 | McGarry | F21V 9/30 | 239/289 |
| RE42,688 E * | 9/2011 | Stegall | B60R 15/00 | 141/1 |
| 8,113,240 B2 * | 2/2012 | Blanchard | F16L 27/02 | 137/630.22 |
| 8,465,059 B1 * | 6/2013 | Price | F16L 27/08 | 285/278 |
| 8,616,241 B2 * | 12/2013 | Swarts | B60R 15/04 | 137/355.16 |
| 8,656,963 B2 * | 2/2014 | Stegall | B60R 15/00 | 141/1 |
| 8,662,118 B2 * | 3/2014 | Hunt | B67D 7/54 | 141/346 |
| 8,752,586 B2 * | 6/2014 | Blanchard | B67D 7/36 | 137/630.14 |
| 8,826,939 B2 * | 9/2014 | Damaske | B60R 15/00 | 137/899 |
| 9,310,003 B2 * | 4/2016 | Blanchard | F16K 31/602 | |
| 9,334,992 B2 * | 5/2016 | Blanchard | F17C 13/04 | |
| 9,676,495 B2 * | 6/2017 | Freeth | F16L 37/127 | |
| 9,857,010 B2 * | 1/2018 | Konishi | F16L 37/35 | |
| 9,874,293 B2 * | 1/2018 | Blanchard | F17C 13/04 | |
| 9,897,239 B2 * | 2/2018 | Konishi | F16L 37/12 | |
| 9,995,420 B1 * | 6/2018 | Topacio | F16K 17/04 | |
| 10,208,877 B2 * | 2/2019 | Konishi | F16L 55/07 | |
| 10,767,799 B2 * | 9/2020 | Hudson | F16L 37/18 | |
| 10,883,665 B2 * | 1/2021 | Thomas | F17C 13/04 | |
| 10,960,990 B2 * | 3/2021 | Gammon | B64D 37/00 | |
| 11,162,641 B2 * | 11/2021 | Thomas | F16K 15/026 | |
| 11,351,935 B2 * | 6/2022 | Van Beek | B60R 15/00 | |
| 11,412,893 B2 * | 8/2022 | Paskert | B01F 27/808 | |
| 11,447,160 B2 * | 9/2022 | Lucks | B61D 35/007 | |
| D967,928 S * | 10/2022 | Van Duijn | B64F 1/28 | D23/213 |

(56) References Cited

U.S. PATENT DOCUMENTS

| | | | | |
|---|---|---|---|---|
| 2001/0035216 A1* | 11/2001 | Kyle | ................ | F16L 37/46 137/613 |
| 2004/0084098 A1* | 5/2004 | Swarts | ................ | B60R 15/04 137/899 |
| 2004/0112432 A1* | 6/2004 | Swarts | ................ | B60R 15/00 137/355.12 |
| 2004/0112448 A1* | 6/2004 | Faahs | ................ | E03F 1/008 137/899 |
| 2005/0150562 A1* | 7/2005 | Anderson | ............ | B60R 15/00 137/899 |
| 2006/0070660 A1* | 4/2006 | Swarts | ................ | B60R 15/00 137/355.12 |
| 2007/0113871 A1* | 5/2007 | Swarts | ................ | E03F 1/008 134/21 |
| 2007/0113896 A1* | 5/2007 | Swarts | ................ | E03F 1/008 137/355.12 |
| 2007/0113897 A1* | 5/2007 | Swarts | ................ | B60R 15/04 137/355.12 |
| 2007/0113898 A1* | 5/2007 | Swarts | ................ | E03F 1/008 137/355.12 |
| 2007/0235096 A1* | 10/2007 | Nielsen | ................ | F16L 3/01 137/899 |
| 2007/0295420 A1* | 12/2007 | Swarts | ................ | B60R 15/04 137/899 |
| 2008/0023090 A1* | 1/2008 | Stegall | ................ | B60R 15/00 137/899 |
| 2009/0014079 A1* | 1/2009 | Stegall | ................ | B60R 15/00 137/1 |
| 2009/0236001 A1* | 9/2009 | Damaske | ............ | B60R 15/00 137/899 |
| 2010/0018590 A1* | 1/2010 | Damaske | ............ | F16L 43/008 137/615 |
| 2011/0005639 A1* | 1/2011 | Weh | ................ | F16L 37/20 141/311 R |
| 2011/0315236 A1* | 12/2011 | Stegall | ................ | B60R 15/00 137/255 |
| 2014/0182712 A1* | 7/2014 | Penner | ................ | E03F 1/008 137/351 |
| 2014/0318671 A1* | 10/2014 | Swarts | ................ | E03F 1/008 141/382 |
| 2017/0241122 A1* | 8/2017 | Swarts | ................ | E03F 1/008 |
| 2018/0354432 A1* | 12/2018 | Van Beek | ............ | B60R 15/04 |
| 2019/0313854 A1* | 10/2019 | Paskert | ................ | A47J 43/07 |
| 2020/0086894 A1* | 3/2020 | Lucks | ................ | B61D 35/007 |
| 2021/0078507 A1* | 3/2021 | Van Beek | ............ | B63B 29/14 |
| 2021/0078508 A1* | 3/2021 | Van Beek | ............ | E03D 9/10 |
| 2021/0078509 A1* | 3/2021 | Van Beek | ............ | E03D 9/10 |
| 2021/0180711 A1* | 6/2021 | Van Riel | ............ | F16K 5/0471 |

OTHER PUBLICATIONS

Examination report for corresponding Australian application No. 2021257935, dated Nov. 25, 2021.

* cited by examiner

DISCHARGE DEVICE FOR VEHICLE WASTEWATER MANAGEMENT SYSTEM

CROSS REFERENCE TO RELATED APPLICATIONS

This application claims priority to U.S. Provisional Application No. 62/501,250 filed 4 May 2017 and U.S. Non-Provisional application Ser. No. 15/968,132 filed 1 May 2018, which applications are expressly incorporated by reference as if fully set forth herein.

FIELD

The present disclosure relates to a wastewater management system for vehicles. The present disclosure also relates to a wastewater management method for vehicles.

BACKGROUND

The statements in this section merely provide background information related to the present disclosure and may not constitute prior art.

In the recreational vehicle or motor home industry, for example, it is common to incorporate a waste management system having at least a permanent waste holding tank. More commonly, RVs are outfitted with two such independent tanks: a "black water" tank for holding semi solid human waste and a grey water tank for holding wastewater from sinks and showers, for example. It is also known to equip an RV with a waste management system having a holding tank that is removable from the RV for emptying and cleaning. Boats and other vehicles may be equipped with similar waste management systems.

While known sanitation systems for vehicles may have proven to be successful for their intended purposes, a continuous need for improvement remains in the pertinent art.

SUMMARY

The present teachings are generally related to various aspects of a wastewater management system for a recreational vehicle or other vehicle.

The present teachings more particularly provide a system for managing wastewater of a vehicle such as an RV that makes disposal of waste (black and grey) water more hygienic, safe and convenient. Through a single discharge nozzle that connects to the black water tank, emptying of all waste from all waste tanks, without spilling, on any types of connection to a wastewater infrastructure is provided. Any observable odor of the waste will be less dominant than in existing situations because of reduced expose to the waste water, controlled use of additives, and regular mixing of wastewater.

The present teachings additionally provide a system for managing wastewater of a vehicle such as an RV which increases the time period between each black water discharge moment by more effective control of chemical and biochemical decomposition processes by mixing the waste in the tanks regularly with continuous and precisely dosed additives, and by reusing grey water to flush the toilet, thereby reducing waste and reducing usage of fresh water.

The system re-uses water from the grey water tank to flush the toilet to reduce fresh water usage, and to reduce the volume of wastewater. Solids may be filtered out from the grey water and the grey water may be treated with additives. The use of additives to control the system is made more convenient, accurate and safe by replacing manual dosage with an intelligent and automated dosing system that doses additives as required.

The vehicle manufacturer is given freedom of placing a toilet practically anywhere in the vehicle by eliminating the traditional, removable waste holding tank and replacing the traditional, removable waste holding tank with a smart macerator and positive pressure pump that uses much less water than traditional macerator toilets and pumps out through very tiny diameter tubing. The reduced tubing diameters lead to reduced dead volumes of waste. This also allows the toilet to be movable in the vehicle.

The system provides the user information about the status of the wastewater management system, based on real time data measured in the system and provides communication via a user interface panel or portable smart device application.

The system reduces the fouling of the wastewater tank walls, extending system life and reducing problems associated with fouling such as odor nuisance and clogging by using appropriately formulated additives dosed as needed and by cleaning the black water tank with grey water upon each discharge.

The system combines discharging of black water and grey water into one action, speeding up the process by eliminating many manual actions such as: carrying the traditionally heavy (±20 kg) waste holding tank to the dump location, pouring the unpleasant content into the dump spot, cleaning the inside of the waste holding tank, uncontrolled dosing of new additives, adding a start volume of water to the tank and placing back the waste holding tank in the vehicle.

In one aspect, the present disclosure relates to a wastewater management system for vehicles. The system may include a black water tank for holding black wastewater and a grey water tank for holding grey wastewater. The system additionally includes a filtering device for filtering suspended solids from the grey water; a first conduit between the grey water tank and the filter; a second conduit between the filter and the toilet, the second conduit associated with a first valve; and a third conduit between the filter and the black water tank, the third conduit associated with a second valve; and a fourth conduit between the filter and the grey water tank, the fourth conduit associated with a second valve. The system further includes a control sub-system in communication with the first and second valves for controlling the first and second valves to deliver filtered grey water to the toilet for flush, to mix the content in the grey water tank and to periodically clean the filter of captured solids and deliver the captured solids to the black water tank.

In another aspect, the present disclosure relates to a method for managing wastewater of a vehicle with the wastewater management system of the preceding paragraph.

In yet another aspect, the present disclosure relates to an apparatus for delivering wastewater from a vehicle to a drain. The apparatus may include a housing 80 having an outer wall 82 and an inner wall 90 generally perpendicular or slightly angled to the outer wall 82. The housing 80 and the inner wall 90 may define an inlet chamber 84 above the inner wall 90 and a further outlet chamber 86 below the inner wall 90.

In still yet another aspect, the present disclosure relates to an additive sub-system for wastewater management system of a vehicle. The additive sub-system includes a grey water additive dispenser, a black water additive dispenser and a flush water additive dispenser. The grey water additive dispenser is in fluid communication with the grey water tank through a pump for delivering a grey water additive to the grey water tank. The black water additive dispenser is in fluid communication with a macerator housing associated with a toilet through a pump for delivering a black water additive to the macerator housing, or with the black water tank through a pump for delivering a black water additive to the black water tank. The flush water additive dispenser is in fluid communication with the flush water conduit through a pump for delivering a flush water additive to the flush water.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
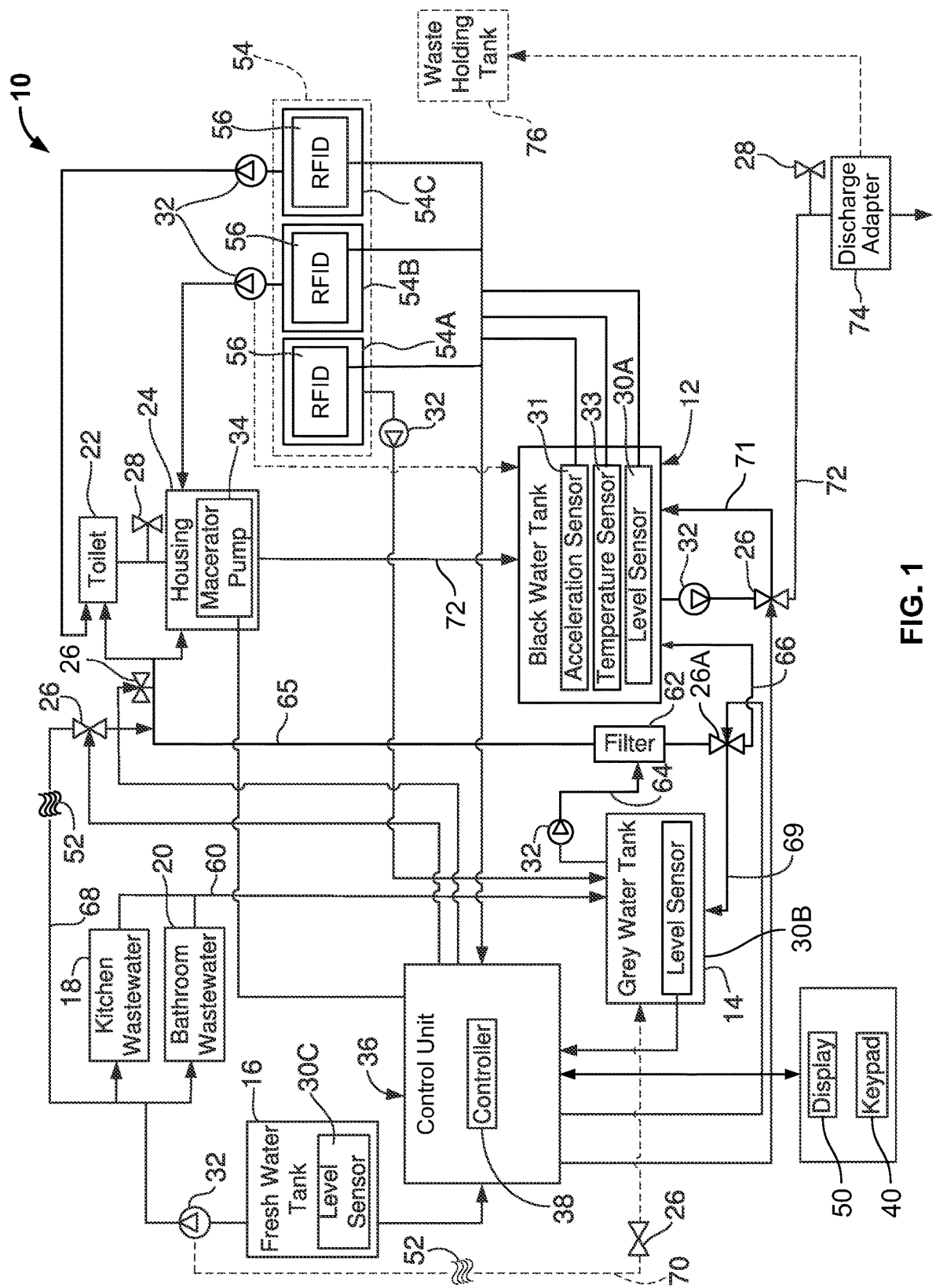
FIG. 1 is a high level block diagram of wastewater management system for a vehicle in accordance with one embodiment of the present disclosure for enabling storage and emptying of black water and grey water from associated black water and grey water holding tanks.
Figure 1A:
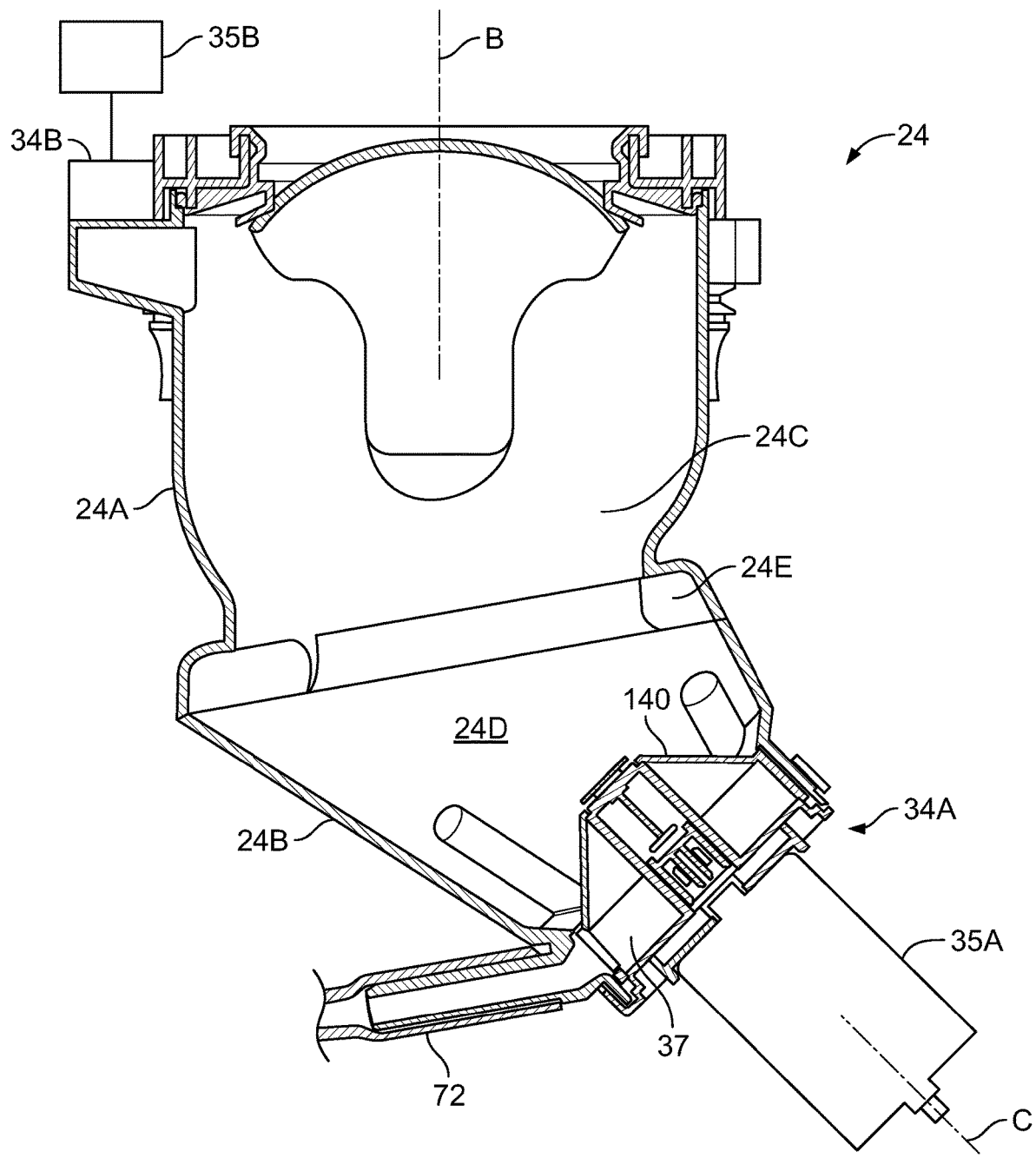
FIG. 1A is a cross-sectional view of a macerator housing for use with the wastewater management system of FIG. 1.

The following description is merely exemplary in nature and is not intended to limit the present disclosure, application, or uses. It should be understood that throughout the drawings, corresponding reference numerals indicate like or corresponding parts and features.

Referring generally to the drawings and particularly to FIG. 1, a wastewater management system in accordance with exemplary embodiment of the present teachings is illustrated and identified at reference character 10 (hereinafter simply the "system 10"). The present teachings are particular adapted for enabling efficient usage and storage of wastewater on a recreational vehicle ("RV") and emptying of wastewater from the RV. It will be understood, however, that the present teachings may be adapted for other applications where wastewater is collected for periodically emptying.

As noted above, present teachings are generally related to various aspects of a wastewater management system for a vehicle. These various aspects are shown in FIG. 1 incorporated into an exemplary system 10, with alternative structures described below and shown in various of the other drawings. These various aspects may be used alone or in combination with each other within the scope of the present teachings.

The system 10 of the present teachings may generally include a first holding structure defined by a black water holding tank 12 and a second holding structure defined by a grey water holding tank 14. The system 10 may also include a fresh water holding tank 16. In general, the grey water tank 14 may hold grey water in the form of kitchen wastewater 18 from a kitchen sink, for example, and bathroom wastewater 20 from a bathroom sink and/or shower, for example. The grey water in the grey water holding tank 14 may be used for flushing of a toilet 22 for purposes of conserving water in the fresh water tank 16, and reduction of grey water in the grey water tank. The black water tank 12, in general, receives black water from a positive pressure pump 34b associated with a macerator housing 24 associated with the toilet 22.

The system 10 is illustrated to include various valves for controlling flow between the various components. As shown, the valves may be electronically controlled valves 26 or manually controlled valves 28. The valves 26 and 28 may be gate valves, or ball valves, for example. Certain of the valves may be three-way valves 26A. It will be understood, however, that the system 10 is not limited to use with any particular type of valves; essentially any form of valve that can be electronically or manually commanded to open and close to accomplish the desired flow within the system 10 may potentially be used with the system 10 within the scope of the present teachings. Explaining further, it will be understood that electronic valves 26 may be substituted with manually controlled valves 28 throughout the system 10 for specific applications within the scope of the present teachings. Additionally, it will be understood that where the system 10 is described to include a combination valve 26A, the combination valve 26A may be replaced with multiple valves to accomplish the same function. In another embodiment, the valves around the tank module are integrated in one single valve housing system using one motor, opening and closing various conduits by different angular states of the motor shaft.

The system 10 may include level sensors 30A, 30B and 30C for sensing the level within the black water tank 12, the grey water tank 14 and the fresh water tank 16, respectively. The level sensors 30A, 30B and 30C may be float assemblies, for example, configured to transmit electronic signals that indicate a fluid level within the corresponding tank 12, 14, and 16. While the level sensors 30A, 30B and 30C may be float assemblies, it will be appreciated that the system 10 is not so limited. Essentially any type of level sensing device (e.g., capacitive, acoustic or otherwise) that is able to sense the level of the fluid within the tanks 12, 14 and 16 and provide electrical signals indicative of the sensed levels, may be used with the system 10. Certain of the tanks 12, 14 and 16 may include further sensors for more accurately sensing tank capacity. For example, the black water tank 12 may include an acceleration sensor 31 and a temperature sensor 33.

The system 10 may further include pumps 32 for pumping fluid (e.g., fresh water, grey water, and black water and additives) through the system 10. The pumps may be any suitable pump known in the art. Preferably, the pumps 32 may be automatically controlled by electronic signals from the controller 38. Alternatively, the pumps 32 may be controlled by user input. In one particular application, the pumps 32 for the grey and black water tanks 14 and 12 are centrifugal pumps and the pumps 32 for the additives are piston pumps. It will be appreciated, however, that any type of pump may be used within the scope of the present teachings.

Figure 4:
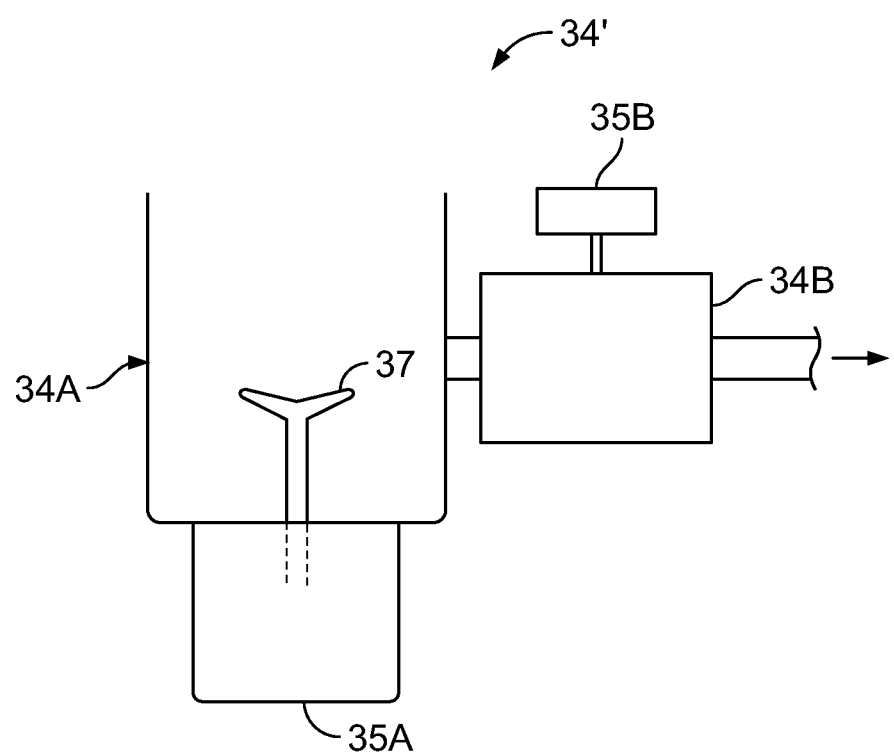
FIG. 4 is a simplified view of a macerator pump arrangement in accordance with the present teachings.

Traditional macerator toilets macerate and pump the waste at the same time in one action. As a result, the waste is not sufficiently macerated and therefore large diameter hoses and a large amount of flush water must be used to prevent clogging. According to the present teachings, the housing 24 associated with the toilet 22 may include a macerator pump arrangement 34. The macerator pump arrangement will be described with particular reference to the simplified view of FIG. 4. The housing 24 is illustrated to include an upper portion 24A and a lower portion 24B. The upper portion 24A of the housing 24 defines an upper chamber 24C. A toilet valve is conventionally mounted in the upper portion 24A for movement between open and closed positions. The upper portion 24A may be generally cylindrical and elongated along an axis B. The lower portion 24B defines lower chamber 24D. The lower portion 24B may have a generally circular cross section in a plane perpendicular to axis C, and may taper in a direction parallel to axis C as it extends from the upper portion 24A. The axes B and C enclose an obtuse angle less than 180°. More particularly, the angle enclosed by the axes B and C is between 60° and 80°.

A narrowing 24E of the housing 24 is located at an intersection of the upper and lower portions 24A and 24B. The narrowing 24E in the outer wall to prevent the waste from being forced upwards by the centrifugal forces during the maceration. The narrowing 24E guides the waste back towards the bottom of the chamber 24C/24D.

The macerator pump arrangement 34 may include a macerator 34A and a positive pressure pump 34B that may work independently from each other. The macerator 24A is located at a lower end of the lower portion 24B and in fluid communication with a hose 72.

First, the macerator 34A runs within the housing 24 like a blender, ensuring that all toilet waste received within the housing 24 is sufficiently macerated into a slurry with use of very little toilet flush water. After that, the waste can be pumped out through a small diameter hose by positive pressure in the macerator chamber 24C/24D, created by the positive pressure pump 34B. The present teachings allow for a small diameter hose 72 having an internal diameter of less than 25 mm, preferably less than 20 mm and more preferably approximately 16 mm or less. This compares with a conventional hose diameter of 25-30 mm. The macerating knives 37 and the pump 34B may be driven by at least one motor. As illustrated, the macerating knives 37 of the macerator 34A may be driven by a first motor 35A and the positive pressure pump (e.g., airpump 34B) may be driven by a second motor 35B. The macerator pump arrangement 34 and resultantly the complete system 10 are much more silent as compared to conventional macerator toilets due to the separated mixing and pumping functions.

The toilet macerator housing 24 may include a sieve 140, positioned between the macerator 34A and the chamber 24D. The sieve prevents large particles of the waste water from entering the small diameter hose 72 to thereby prevent clogging of the hose 72. Particles blocked by the sieve 140 being macerated by the knives 37 that run close to the sieve 140.

In use, the first and second motors 34A and 35B may be automatically controlled with the controller 38. In this regard, a single user initiated flush command (e.g., passing a button or level) may cause the controller 38 to first run the first motor 35A and to subsequently run the second motor 35B.

Figure 5A:
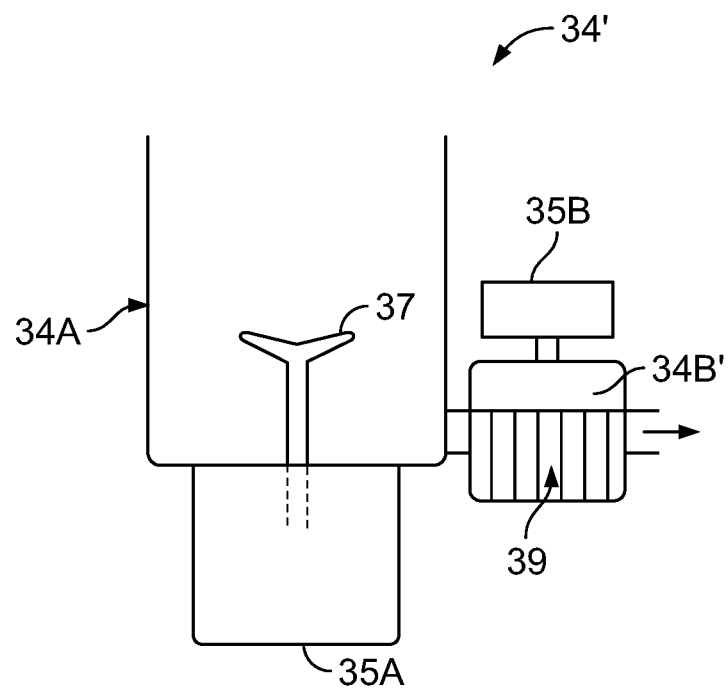
FIG. 5A is a simplified view of another macerator pump arrangement in accordance with the present teachings.

In another embodiment of this invention, which is shown in the simplified view of FIG. 5A, the macerator pump arrangement 34 may similarly include a macerator 34A and a pump 34B' that may work independent from each other. In this embodiment, the pump 34B' is a centrifugal pump. As above, the macerator 34A first runs within the housing 24 like a blender, ensuring that all toilet waste received within the housing 24 is sufficiently macerated into a slurry with use of very little toilet flush water. After that, the waste can be pumped out through a small diameter hose by the pump 34B'. Macerating knives 37 of the macerator 34A may be driven by a first motor 35B and pump blades 39 of the centrifuged pump 34B' may be driven by a second motor 35B. Again, the macerator pump arrangement 34 and resultantly the complete system 10 are much more silent as compared to conventional macerator toilets due to the separated mixing and pumping function.

Figure 5B:
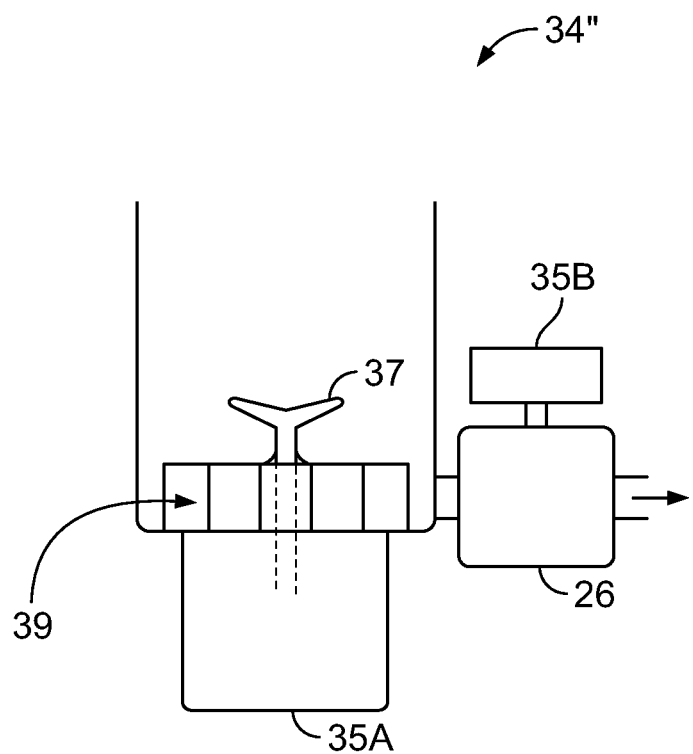
FIG. 5B is a simplified view of another macerator pump arrangement in accordance with the present teachings.
Figure 6:
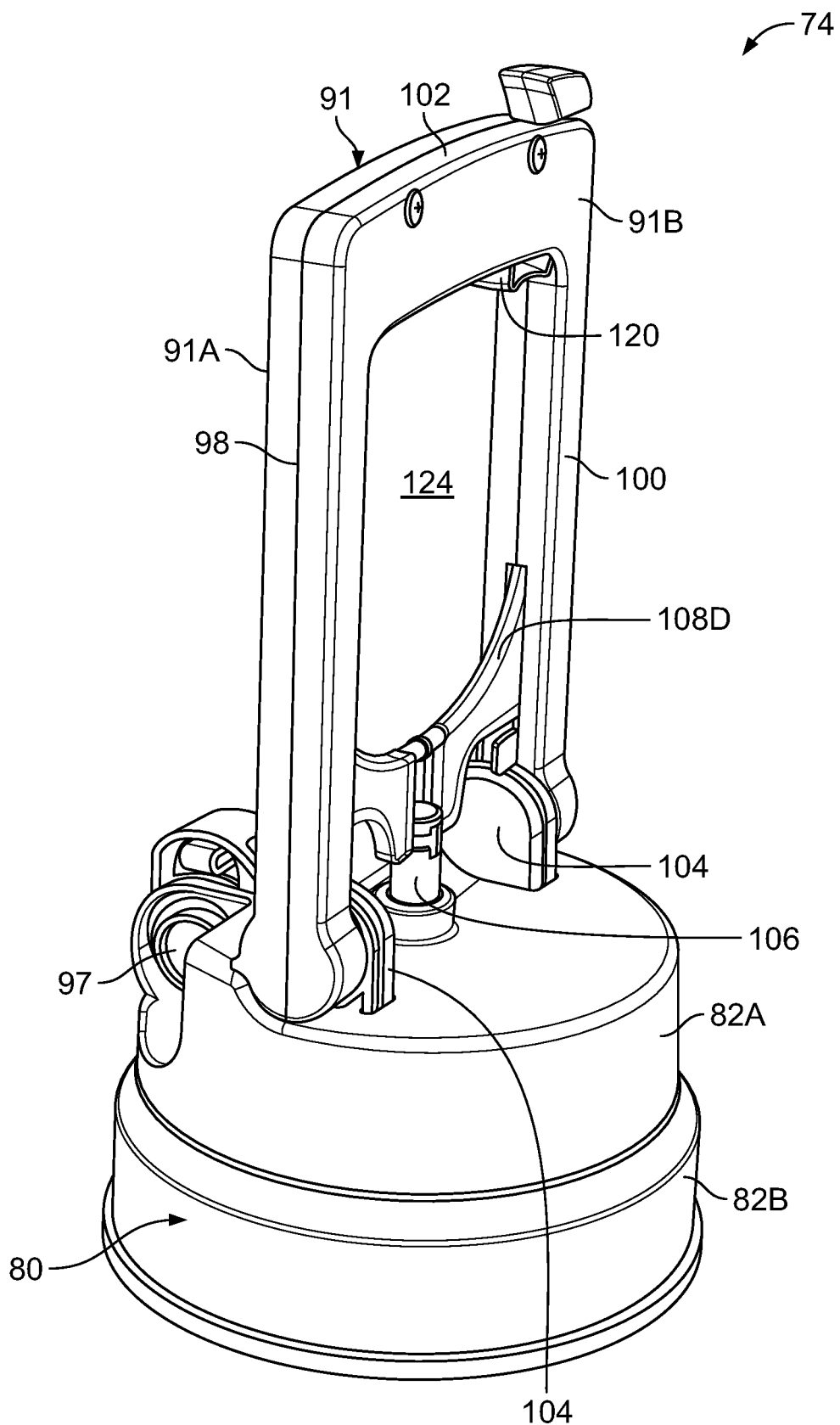
FIG. 6 is a perspective view of the discharge adapter of FIG. 3.
Figure 7:
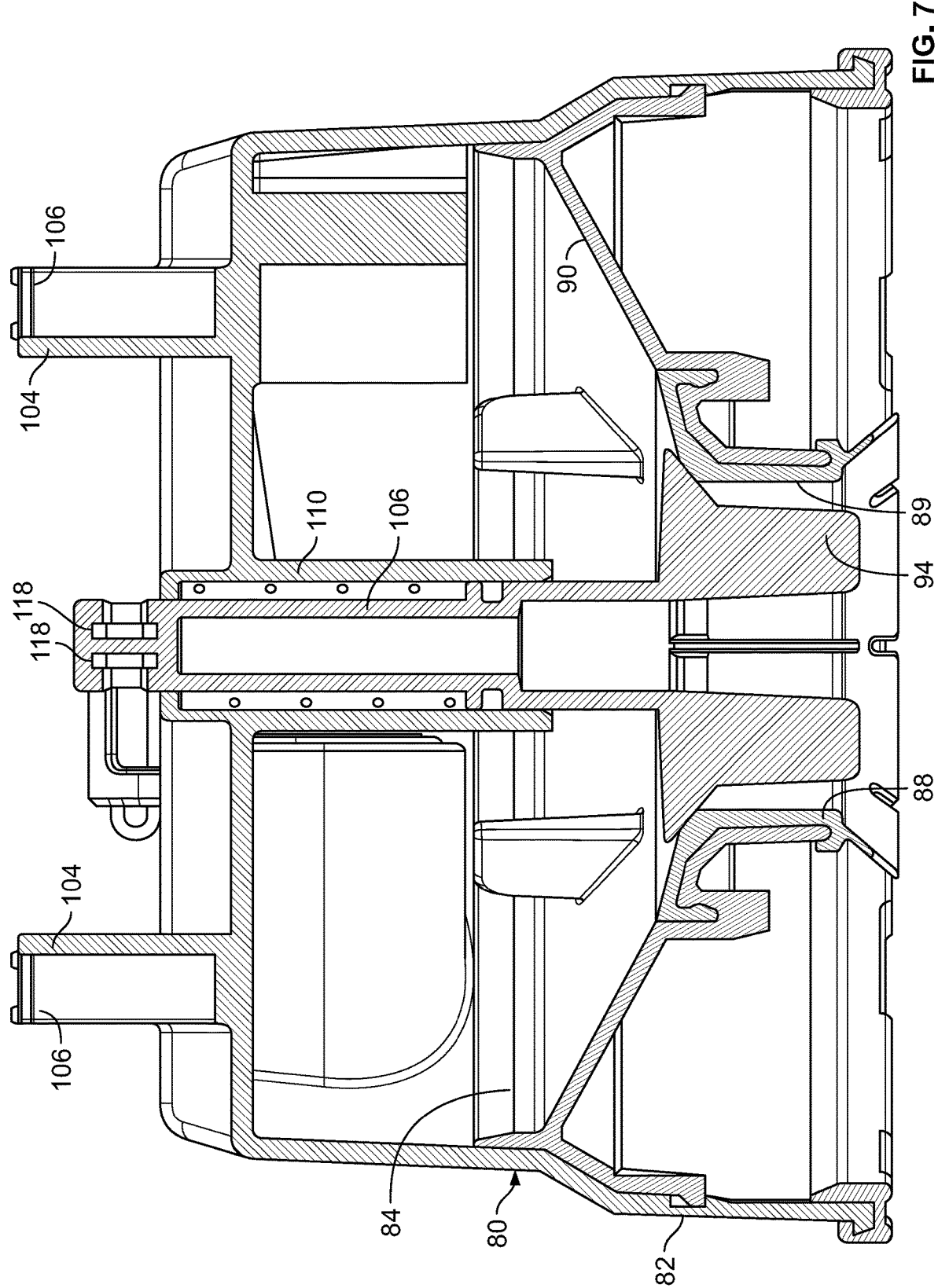
FIG. 7 is a cross-sectional view taken through a base of the discharge adapter of FIG. 3.

In another embodiment of the present invention shown in the simplified view of FIG. 5B, the housing 24 associated with the toilet 22 may include a macerator pump arrangement 34" and a valve 26 (shown immediately below the macerator pump 34 in the schematic drawing of FIG. 1). The macerator pump arrangement 34" has both a macerating and pumping function integrated in one design with one motor. A single motor 35a is operative to drive both macerating knives 37 and pump blades 39 of the macerator pump 34. The valve 26 associated with the macerator pump 34 steers the pump mode between macerating and pumping. When the valve 26 is closed, ensuring that all waste does not leave the macerating housing 24, the macerator pump arrangement 34" is operated by the controller 38 in macerating mode on high voltage, and all waste is mashed into slurry. After that, the valve 26 opens and the macerator pump arrangement 34" is controlled by the controller 38 to operate in pumping mode on low voltage. When the macerator pump arrangement 34" operates in the pumping mode, the slurry gets pumped to the black water tank 12. By alternating the voltage of the macerator pump arrangement 34" between the different modes, reduced noise may be achieved.

With further reference to FIG. 1, a control sub-system in the form of a control unit 38 and a display unit may be incorporated for controlling the management of wastewater within the system 10 and for emptying of the wastewater tanks 12, among other functions to be described herein. The control unit 36 may be located anywhere in the vehicle. The control unit 38 may include a controller 38 which is in communication with the macerator pump 34, with each of the valves 26, and with each of the level sensors 30A, 30B and 30C. While not illustrated in FIG. 1, it will be understood that the controller 38 may also be in communication with the various pumps 32 of the system.

The display unit 50 may incorporate a user operated keypad 40 or other buttons in communication with the controller 38 for initiating programmed routines of the system 10 and/or for opening/closing selected ones of the valves 26 or pumps. The macerator pump 34 may be controlled at the toilet 22, for example. The grey water pump 32 may be controlled at both the toilet 22 (for flushing) and at a display 50 of the display unit 36 (for instance, for pumping grey water to the black water tank 12, for mixing grey water or as part of an automated cleaning cycle). The controller 38 may be in communication with a display 42. The display may be an LCD touchscreen display 42, for example. The display 42 may have soft touch keys or controls to enable user selection various functions. Such soft touch keys or controls may be in addition to or in lieu of the keypad 40.

In other implementations remote actuation of the black water pump 32 and opening/closing of the valves 26 may be accomplished by either a key fob or even a smartphone running a suitable software application. In either event, the key fob or the smartphone may be in wireless communications with a suitable RF transceiver sub-system (not shown) in communication with the controller 38. The RF transceiver sub-system may operate in accordance with a well-known short range, wireless communication protocol, for example the BLUETOOTH® wireless communications protocol, or any other suitable protocol. This enables the user to remotely control the system 10 from a short distance. The user may also have the ability to view tank levels and notifications on a long range distance.

Figure 2:
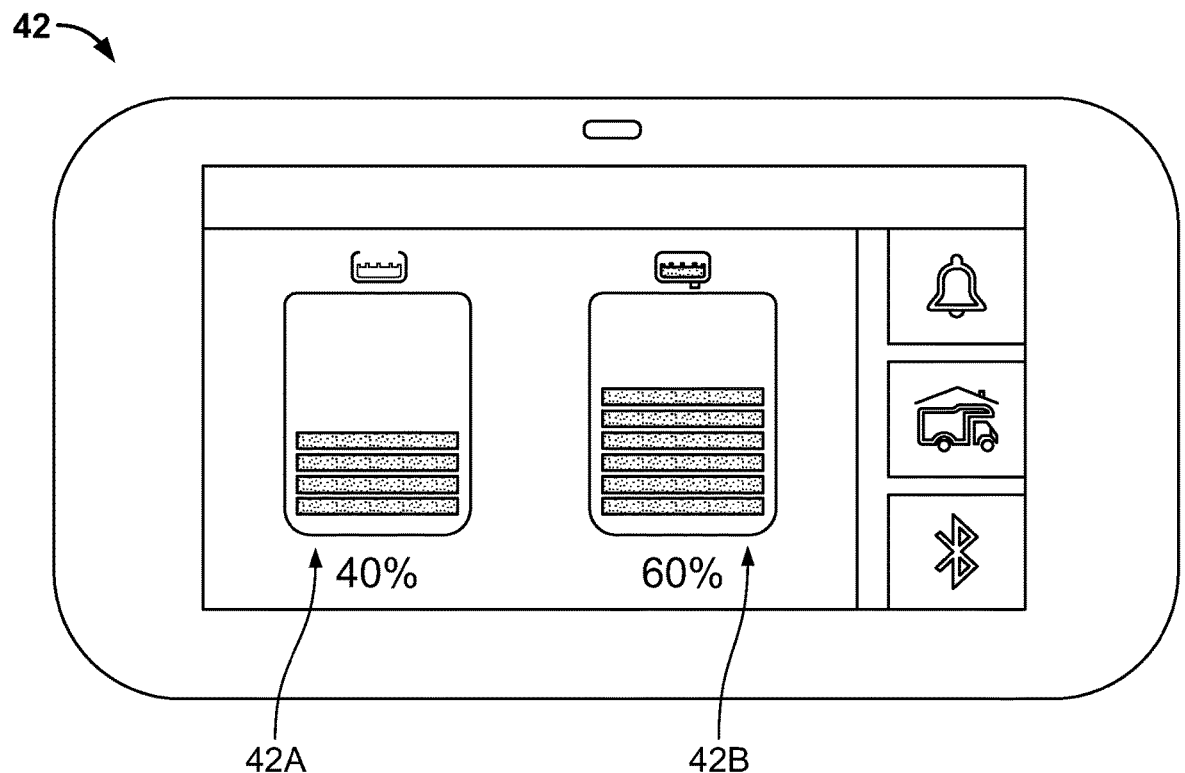
FIG. 2 is an illustration of one example of a control panel for controlling the system of FIG. 1.

With particular reference to FIG. 2, an exemplary display 42 in accordance with the present teachings is illustrated. The display 42 may include a first portion 42A that visually represents a capacity of the fresh water tank 16. The display 42 may also include a second portion 42B that visually represents a capacity of the black and grey water tank combined 12. Other portions of the display 42 may include a storage mode, connectivity options, notifications, including but not limited to a notification for an empty additive stock.

It will be understood that the system 10 of the present teachings may be controlled in any manner. In this regard, the control/display unit may be separated into a control unit (always fixed in the tank or toilet module) and a display unit (remote device or integrated in the RV central panel). The display unit 36 may be integrated in the central display unit already present in conventional RV's through any type of communication. The display unit may also be a remote device.

As shown in dashed lines in FIG. 1, the fresh water tank 16 may optionally be in fluid communication with the grey water tank 14. This fluid communication may be through a valve 26. This fluid communication may also be through a bacterial backflow prevention 52. With such an optional communication between the fresh water tank 16 and the grey water tank 14, fluid communication between the fresh water tank 16 and the toilet 22 would not be required. Explaining further, such optional fluid communication may deliver fresh water to the grey water tank 14 for toilet flushing in the event the grey water tank 14 is empty or below a predetermined level and the system 10 does not provide for direct communication between the fresh water tank 14 and the toilet 22. Additionally, this communication between the fresh water tank 16 and the grey water tank 14 may be used for complete flushing/rinsing of the system 10.

The system 10 may additionally include an additive sub-system 54. The additive sub-system 54 may include additive dispensers 54A, 54B, and 54C. Each of the additive dispensers 54A, 54B, and 54C may be refillable with specific additives. In one embodiment, the additive dispensers 54A, 54B, and 54C may receive replaceable cartridges containing the specific additives. Each additive cartridge 54A, 54B, and 54C may be associated with an RFID label 56 that communicates with the controller to keep track of the pumped volume of additives from the dispenser. In this manner, the controller 38 can communicate the remaining level of additives to the user on the display. The RFID label 56 may also include, store and communicate other information such as, but not limited to, cartridge lifetime, cartridge type for keying in the wrong receptacle, cartridge producer, relevant usage data, etc.

In alternative applications within the scope of the present teachings, each additive dispenser 54A, 54B, and 54C may be associated with a level sensor (not shown) for delivering an electronic signal to the controller 38 indicative of a corresponding level or indicative that the additive is out or almost out (e.g., the additive requires filling or cartridge replacement).

In one particular application, the amperage value of each additive dispenser 54A, 54B, and 54C may be monitored during pumping. A relatively high amperage value will confirm that the dispenser is pumping liquid (e.g, additive remains in the dispenser). A relatively low amperage will indicate that the dispenser is pumping air and the cartridge level is too low (e.g., additive needs to be added).

The additive dispenser 54A may be in fluid communication with the grey water tank 14 through a pump 32 for delivering a grey water additive to the grey water tank 14. Dosing of the grey water additive to the grey water tank 14 may be controlled automatically by the controller 38. For example, the controller 38 may control dosing of the grey water additive to the grey water tank 14 in response to detection of a predetermined volume level of grey water in the grey water tank 14 by the level sensor 30B.

The additive dispenser 54B may be in fluid communication with the housing 24 associated with the toilet 22 through a pump 32 for delivering a black water additive. In this manner, black water additive may be delivered to the macerator housing 34A in response to a flush of the toilet 22. Alternatively, the black water additive may be delivered directly to the black water tank 12 (as shown in FIG. 1 in dashed lines). The amount of additive per flush may be fixed and be sufficient to control the generation of malodor by the contents of the black water tank 12. Alternatively, the amount of black water additive per flush may be adjusted by the control 38 based on various factors, including but not limited to a time that waste is held in the black water tank 12, a temperature of the black water tank 12, a volume of black water in the black water tank.

The additive dispenser 54C may be in fluid communication with the flush conduit 65 through a pump 32 for delivering a flush water additive to the toilet bowl which is activated by a flush signal. In certain applications, each of the additive dispensers 54A, 54B, and 54C may also be associated with a sensor to sense the age of the corresponding additive and communicate a corresponding signal to the controller 38 when replacement is needed due to additive expiration.

As described, the wastewater management system 10 of the present teachings includes three cartridges 54A, 54B and 54C each containing a liquid composition to serve grey water, black water and flush water, respectively. The flush water additive of the system 10 provides a synergistic effect when grey water is reused. Similarly, the flush water additive has a synergistic effect with the black water additive. The grey water additive keeps the microbiological activity and malodour formation controlled in the grey water, enabling the flush water additive to improve the odour experience. This function is achieved by a mix of surfactants, sequestrants and odour control agents. The flush water additive reinforces the activity of the black water additive, thereby enabling malodour control in the black water tank. This function is achieved by a mix of surfactants, perfume and odour control agents.

Use of the system 10 of the present teachings will now be further described. When an RV equipped with the system 10 begins a trip, the fresh water tank 16 may be substantially or completely full. The black water tank 12 and the grey water tank 14 may be substantially or completely empty. The system 10 may monitor the levels within the tanks 12, 14 and 16 with the sensors 30A, 30B and 30C, respectively. At least the level of the black water tank 12 may be additionally monitored with an acceleration sensor 31 to more accurately assess tank capacity. The sensed levels of the tanks 12, 14, and 16 may be communicated to the controller 38 and in turn displayed for the user on the display 42, or the remote display.

Kitchen wastewater 18 from a kitchen sink, for example, and bathroom wastewater 20 from a bathroom sink and/or shower, for example, may drain to the grey water tank 14 under the force of gravity through a conduit 60. The kitchen wastewater 18 and bathroom wastewater 20 may be collected and stored in the grey water tank 14. The grey water in the grey water tank 14 may be used for flushing of the toilet 22 in response to a user request for flushing. This grey flush water is delivered to a filter 62 through a conduit 64. The filter 62 filters solids from the grey water to create a visually acceptable toilet flush water for the user. Filtered grey flush water is delivered to the toilet 22 for flushing through a conduit 65. The flush water additive discussed below may be introduced at this location. The conduit 65 is associated with a valve 26. Explaining further, the controller 38 may operate to open the electronically actuated valve 26 associated with the conduit 65 and pump grey water to the toilet 22.

At the toilet 22, there may be an optional extra valve to route the flush water to either a bowl of the toilet 22 (to flush the toilet) or to the macerator housing 24 (to rinse the housing 24 as part of an automated cleaning cycle).

The conduit 65 may also be associated with a pressure sensor (not shown). If there is no pressure sensed by the pressure sensor, a clogged filter condition may exist. Appropriate user notification may be sent to the controller 38 and displayed on the display 42.

The solids collected by the filter 62 may be periodically transported to the black water tank 12 through a conduit 66. In this regard, the controller 38 periodically functions to close the valve 26 associated with the conduit 65, open a three-way valve 26A associated with the conduit 66 to communicate the filter 62 with the black water tank 12, and pump grey water from the grey water tank 14 through conduit 64 and into the filter 62. These actions clean the inside of the filter 62 and transport the filtered solids through conduit 66 from the filter 62 to the black water tank 12.

The grey water in the grey water tank 14 is treated with automatically dosed additives. The filter 62 also enables a grey water mixing cycle that more evenly distributes grey water additives to treat the grey water and at the same time flushes the filter medium of the filter 62 clean. In this regard, a further conduit 69 extends from the filter 62 to the grey water tank 14. As shown in the embodiment illustrated, the further conduit 69 may be associated with the three-way valve 26A. Explaining further, the valve 26A may be controlled to completely close flow to either conduit 66 or conduit 69, may be opened to flow only to conduit 66 or may be open to flow only to conduit 69. As will be discussed below, a hose or conduit 72 may extend between the black water tank 12 and the discharge adapter 74. The conduit 72 may be associated with a three-way valve 26A and a pump 32. The valve 26A may be connected back to the black water tank 12 through black water mix conduit 71. When the valve 26A is positioned in a mixing mode to allow flow back to the black water tank, the black water gets mixed when the black water pump 32 runs. Mixing of the black water is preferred to avoid sediments of black water in the tank and also to distribute incoming additives from the toilet macerator chamber with the total black water volume in the tank. The 26A valve can also be operating in dumping mode open to the discharge adapter 74.

In the event that the grey water tank 14 does not have sufficient grey water to complete a requested flush cycle of the toilet, the toilet 22 may be flushed with fresh water. Flushing of the toilet 22 with fresh water may be accomplished in two different manners depending on the particular configuration of the system 10. In a first manner, upon sensing of a low level of grey water within the grey water tank 14, the controller 38 opens an electronically actuated valve 26 associated with a conduit 68 between the fresh water tank 16 and the toilet 22. Fresh water is pumped from the fresh water tank 16 to the toilet 22. In a second manner, the controller 38 may open an electronically actuated valve 26 associated with an option conduit 70 between the fresh water tank 16 and the grey water tank 14. Fresh water is pumped from the fresh water tank 16 to the grey water tank 14. The controller then delivers the fresh water residing in the grey water tank 14 to the toilet 22 in the manner discussed above.

The flush water additive may be dosed into the system 10 anywhere along the supply line of grey water flush 65.

The additive sub-system 54 provides for a flexible and automatic dosage of additives as required based on actual waste production. This makes sure that the quantity of additives in the waste tanks is always appropriate for the actual situation; not too high (waste of additives) and not too low (uncontrolled microbial activity).

The black water tank 12 and the grey water tank 14 may be periodically emptied in response to a user command entered through a control on the discharge adapter 74 or by a remote device. Such emptying of the black water tank 12 may be desired when the black water tank 12 has reached capacity or when an RV trip has been completed, for example. In response to user input, the controller 38 may operate to open the valve 26 associated with the conduit 72 providing fluid communication between the black water tank 12 and a drain 96 or discharge adapter 74. The conduit 72 may also be associated with a first manually actuated valve 28 proximate the discharge adapter 74. Upon opening the valve 28, the controller 38 may pump black water from the black water tank 12 to the discharge adapter 74. After the black water tank 12 is emptied, the grey water pump will pump the grey water into the black water tank 12 to rinse the walls of the black water tank 12 and empty the grey water tank 14. The grey water will then travel from the black water tank 12 to the discharge adapter 74 to clean out the discharge adapter 74 and associated hoses.

Optionally, the discharge adapter 74 may be connected to a further waste holding tank 76. The further waste holding tank 76 may be permanently or removably carried by the RV, may provide further capacity for black water storage, and may to be able to dump waste in a traditional way (i.e., transport of the waste holding tank 76 without moving the vehicle). One suitable type of portable waste holding tank 76 is sold by the assignee of this application under the trademark Cassette®.

Figure 3:
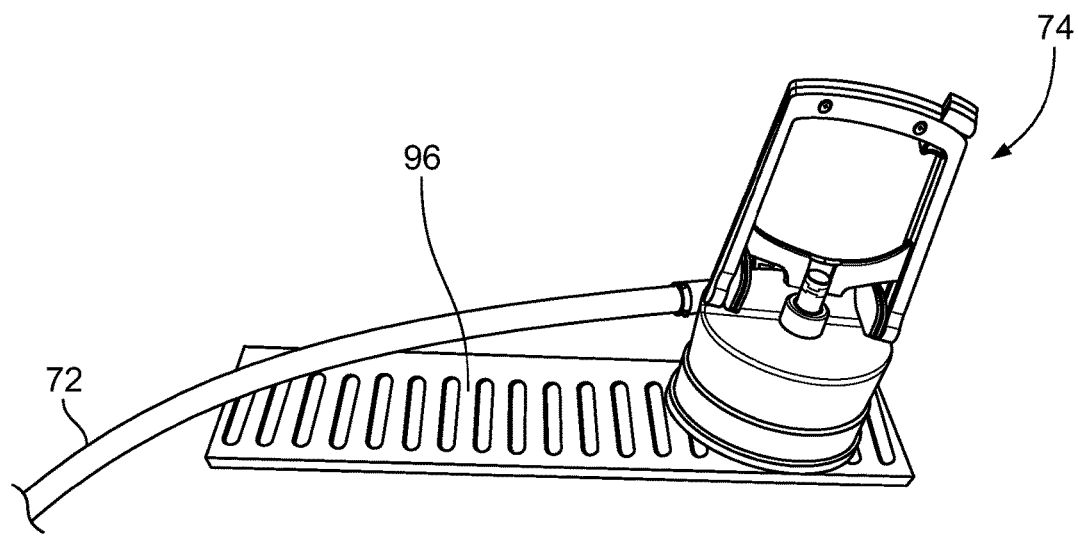
FIG. 3 is an environmental view of an apparatus for delivering wastewater from a vehicle to a drain in accordance with the present teachings, the apparatus or discharge adapter shown operatively associated with a drain.

The discharge adapter 74 enables a high flow rate through small diameter hoses while discharging waste from the black water tank 12 without spilling waste outside of the designated disposal area. The discharge adapter 74 is designed to fit a large variety of sewer grates 96. Preferably the discharge adapter 74 is stored on the outside of the vehicle, or stored in a separate compartment that is easily accessed and hygienic to use. With particular reference to FIGS. 3 and 6 through 9 an exemplary embodiment of a discharge adapter 74 for delivering wastewater from a recreational vehicle to a drain 96 is shown and generally identified at reference character 74. In FIG. 3, the discharge adapter 74 is shown operatively associated with a conventional drain 96 and further operatively associated with hose 72 or conduit for delivering waste from the system 10 to the discharge adapter 74.

The discharge adapter 74 is illustrated to generally include a housing 80, a sealing member 83 and a handgrip 91. The housing 80 may be unitarily constructed of plastic, for example. In the embodiment illustrated, the housing 80 is shown to be cylindrical in shape. An outer wall 82 of the housing 80 includes an upper portion 82A circumferentially defining an inlet chamber 84 and a lower portion 82B circumferentially defining a further chamber 86 for receiving the sealing member 83. The inlet chamber 84 is in fluid communication with an inlet 97. The conduit 72 is attached to the inlet 97.

The housing 80 further includes an outlet seat 88 downwardly extending from the inlet chamber 84 and defining an outlet opening 89. The outlet 8g outlet opening 89 may be cylindrical and centrally located within the housing 80. The outlet seat 88 may be connected to the outer wall 82 of the housing 80 through an inner wall 90. The inner wall 90 may be generally perpendicular or slightly angled to the outer wall 82. As shown, the inner wall 90 radially extends and separates the inlet chamber 84 from the further chamber 86. The outlet seat 88 may terminate short of a lowermost end 82C of the outer wall 82 of the housing 80.

In one particular application, the sealing member 83 may be constructed of any suitable material. In a radial direction, the sealing member 83 is positioned between the outlet seat 88 and the outer wall 82. In an axial direction, the sealing member 83 is position below the radially extending wall 90. In an uncompressed state, the sealing member 83 extends below the lowermost end 82C of the outer wall 82 of the housing 80. As illustrated, the sealing member 83 may include a lower portion 82B that radially extends inwardly below the wall defining the outlet opening 89.

The handgrip 91 may be formed separately from the housing 80 and attached thereto to make the handle collapsible. Alternatively, the handgrip 91 may be formed unitarily with the remainder of the housing 80. The handgrip 91 is generally U-shaped including first and second downwardly extending legs 98 and 100 connected by an intermediate portion 102. As illustrated, the handgrip 91 is hollow and is formed of first and second handgrip halves 91A and 91B. The handgrip halves 91A and 91B may be snap-fit together, connected with fasteners or connected in any manner well known in the art. Lower ends of the first and second legs 98 and 100 are rotatably received within ears 104 upstanding from an upper surface of the housing 80. Explaining further, the ears 104 define radially outward facing and cylindrically shaped openings 106. These openings 106 rotatably receive the correspondingly shaped free ends of the first and second legs 98 and 100 such that the handgrip 91 may be rotated between an upright, use position (as shown in the drawings) and a lowered or stored position. While not shown in the drawings, it will be understood that the lowered, stored position is attained by rotating the handgrip 91 ninety degrees from the upright, use position.

Figure 8:
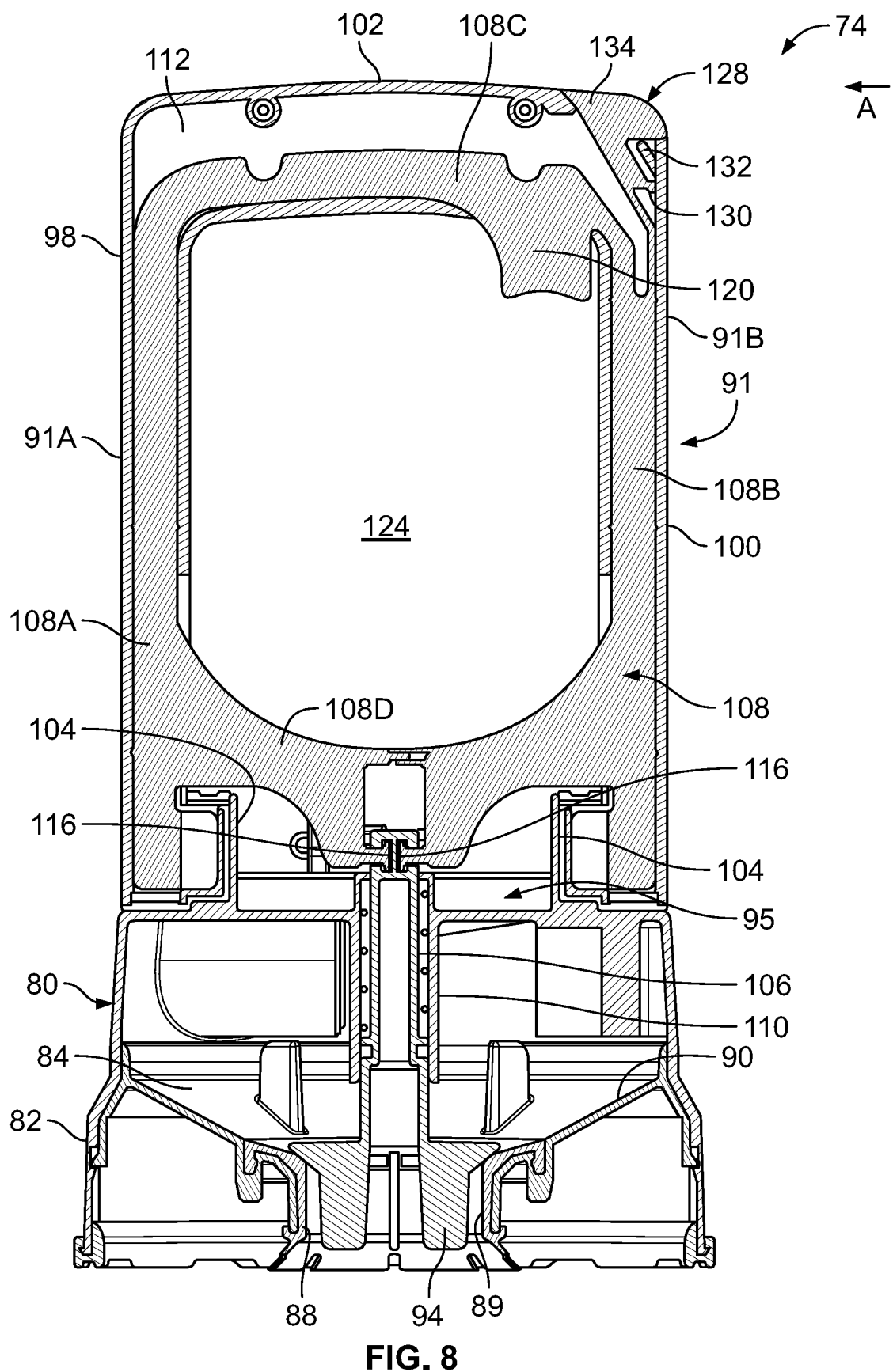
FIG. 8 is a cross-sectional view taken through the discharge adapter of FIG. 6, illustrated with a valve of the discharge adapter in a closed position.
Figure 9:
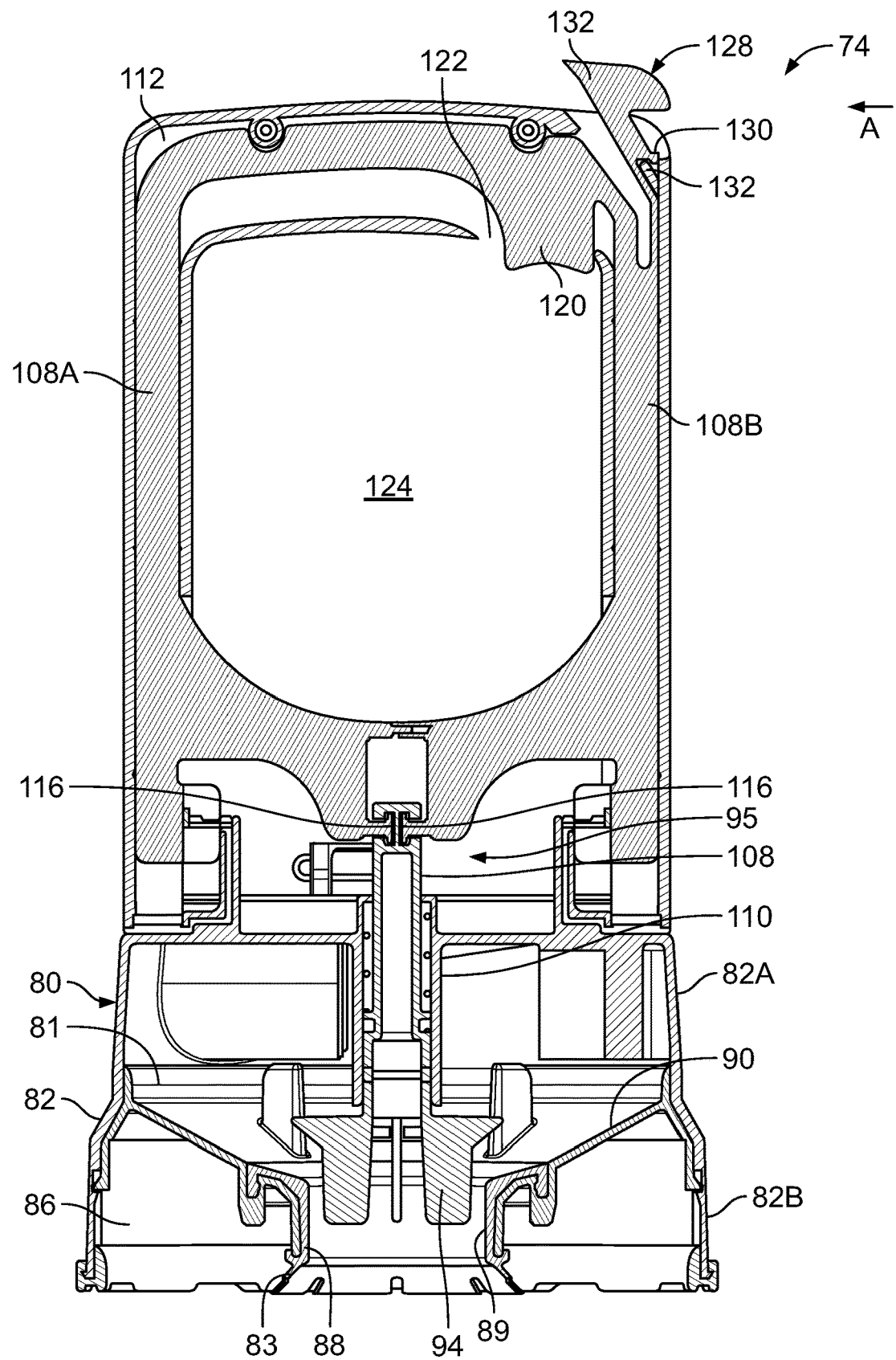
FIG. 9 is another cross-sectional view taken through the discharge adapter of FIG. 6, illustrated with a valve of the discharge adapter in an open position.

As illustrated, the discharge adapter 74 may include a valve 94 that ensures a closed and leak-free gate after each discharge cycle. The valve 94 may be opened and closed by the user. The closed position is shown in FIG. 8. The open position is shown in FIG. 9. The valve 94 has a sealing part that presses against the wall 90. The sealing part is positioned in close proximity to the outlet 88 of the discharge adapter 92 to ensure minimal dripping of waste from the discharge adapter 92.

The discharge adapter 74 may include a valve activation mechanism 95 that is an integrated part of the handgrip 91 of the discharge adapter 74.

The valve activation mechanism 95 is illustrated to generally include a plunger 106 and a user control member 108. The valve 94 is carried at a lower end of the plunger 106. The valve 94 may be integrally formed with the plunger 94 or formed as a separate part and secured to the lower end of the plunger 106. In the embodiment illustrated, the plunger 106 is cylindrical in shape and disposed within a correspondingly, cylindrically shaped conduit 110 integrally formed with the housing 80. The plunger 106 is movable within the conduit 110 between a lowered position (shown in FIGS. 7 and 8, for example) and an upper position (shown in FIG. 9, for example). In the lowered position, the valve 94 is seated and flow between the chamber 84 and the outlet 88 is prevented. In the upper position, the valve 94 is unseated to allow flow between the chamber 84 and the outlet 88. The plunger 106 may be biased to its lowered position with a spring, for example.

The user control member 108 is generally disposed within a cavity 112 defined between the halves 91A and 91B of the handgrip 91 and rotates with the handgrip 91. As shown, the user control member 108 includes first and second legs 108A and 108B, an upper laterally extending portion 108C that laterally extends between the first and second legs 108A and 108B, and a lower laterally extending portion 108D that also laterally extends between the first and second legs 108A and 108B.

The user control member 108 is rotatably coupled to the upper end of the plunger 106. In this manner, the handgrip 91 (and thereby the user control member 108) may be rotated relative to the housing 80. As illustrated, the lower laterally extending portion 108C is formed to include a pair of inwardly extending portions 116. The inwardly extending portions 116 may be disk shaped or cylindrical and may be rotatably received within correspondingly shaped cavities 118 formed in the upper end of the plunger 106.

The user control member 108 is movable within the handgrip 91 between a lowered position (shown in FIGS. 7 and 8, for example) and an upper position (shown in FIG. 9, for example). In the lowered position, the plunger 106 is in its lowered position, the valve 94 is seated and flow between the chamber 84 and the outlet 88 is prevented. In the upper position, the plunger 106 is in its upper position and the valve 94 is unseated to allow flow between the chamber 84 and the outlet 88.

The user control member 108 further includes a button 120 that may be depressed by the user. The button 120 may be integrally formed with the user control member 108 and extend through an opening 122 in the intermediate portion 102 of the handgrip 91. In this regard, the button 120 may normally extend into a central opening 124 defined by the handgrip 91. The user may grasp the handgrip 91 and squeeze the button 120 to translate the user control member 108 from the lowered position to the upper position. In use, the discharge adapter 74 may be placed upon a conventional drain 96 (as shown in the environmental view of FIG. 3, for example). The discharge adapter 74 may be balanced and of sufficient weight such placement by the user on the drain 96 operates to compress the sealing member 83. In response to user input to the activation button, the controller 38 may open the electronically actuated valve 26 associated with a conduit 72 to thereby deliver wastewater from the recreational vehicle to the drain 96 via the discharge adapter 74. Explaining further, by opening the valve 26 associated with the conduit 72, the controller 38 may pump black water from the black water tank 12 to the discharge adapter 74. After the black water tank 12 is emptied, the grey water pump will pump the grey water into the black water tank 12 to rinse the walls of the black water tank 12 and empty the grey water tank 14. The grey water will then travel from the black water tank 12 to the discharge adapter 74 to clean out the discharge adapter 74 and associated hoses.

The user control member 108 may include a retention mechanism 128 for retaining the user control device 108 in the upper position and thereby maintain the valve 94 in an open orientation. The retention mechanism 128 may be integrally formed with or carried by the user control member 108. As shown in the drawings, the retention mechanism 128 is integrally formed with the user control member 108 and upwardly extends from the leg 108B. The user control mechanism 128 includes a detent 130. As the user control member 108 translates from its lower position to its upper position, the detent 130 rides along a ramp 132 carried by the leg 108B of the handgrip 91. As the user control member 108 approaches the upper position, the upper end 134 of the retention mechanism and the detent 130 are inwardly deflected. When the detent 130 passes the ramp 132, the retention mechanism elastically rebounds such that the detent 130 is positioned over the ramp 132 (as shown in FIG. 9, for example) and engagement between the detent 130 and the ramp 132 prevents inadvertent movement of the user control mechanism 128 from the upper position to the lower position. In this regard, the upper end of the retention mechanism 128 must be deflected in an inward direction A before the user control mechanism 128 can be lowered from the upper position.

Figure 10:
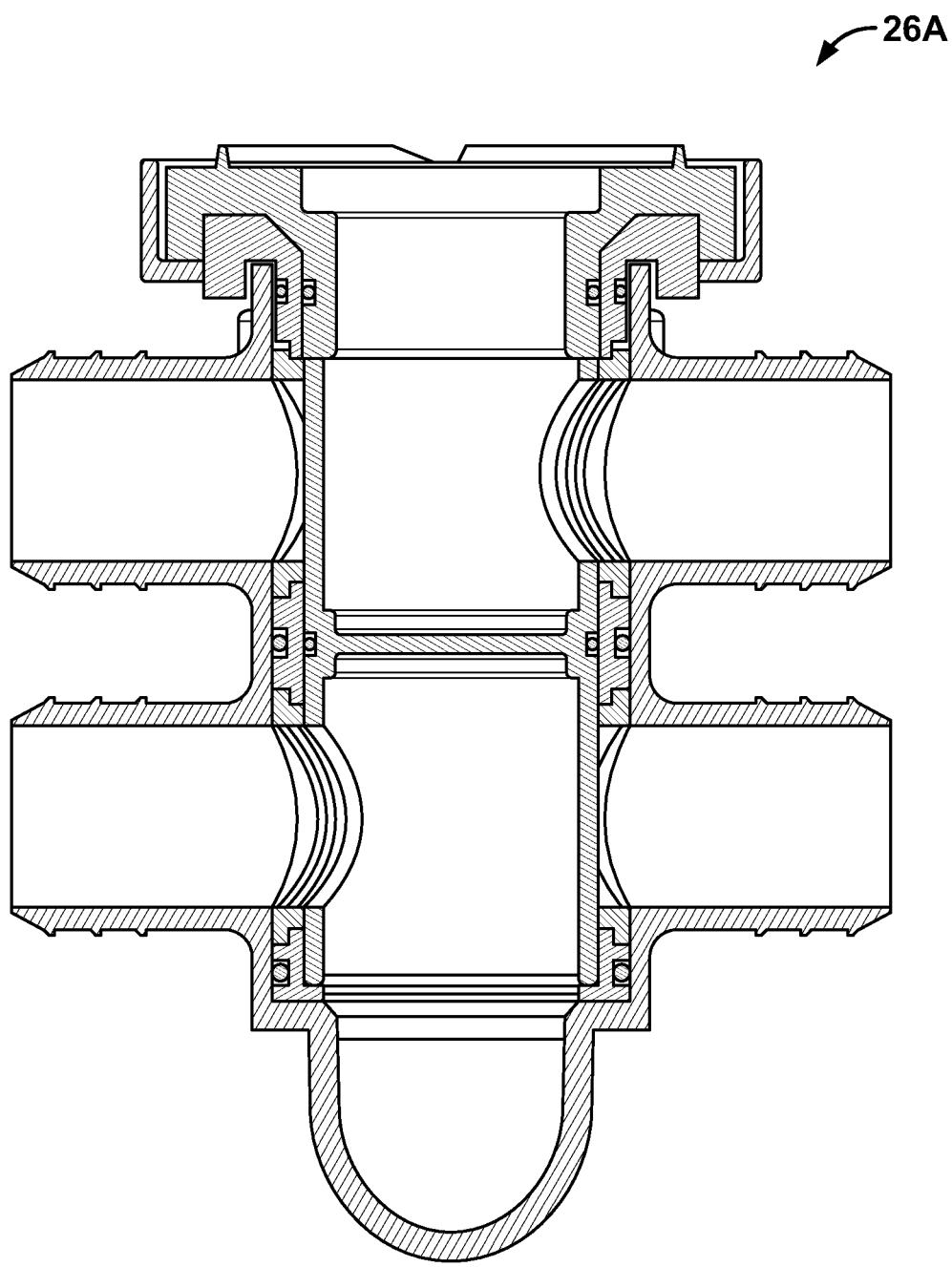
FIG. 10 is a cross-sectional view of a combination valve of the wastewater management system of the present teachings.
Figure 11:
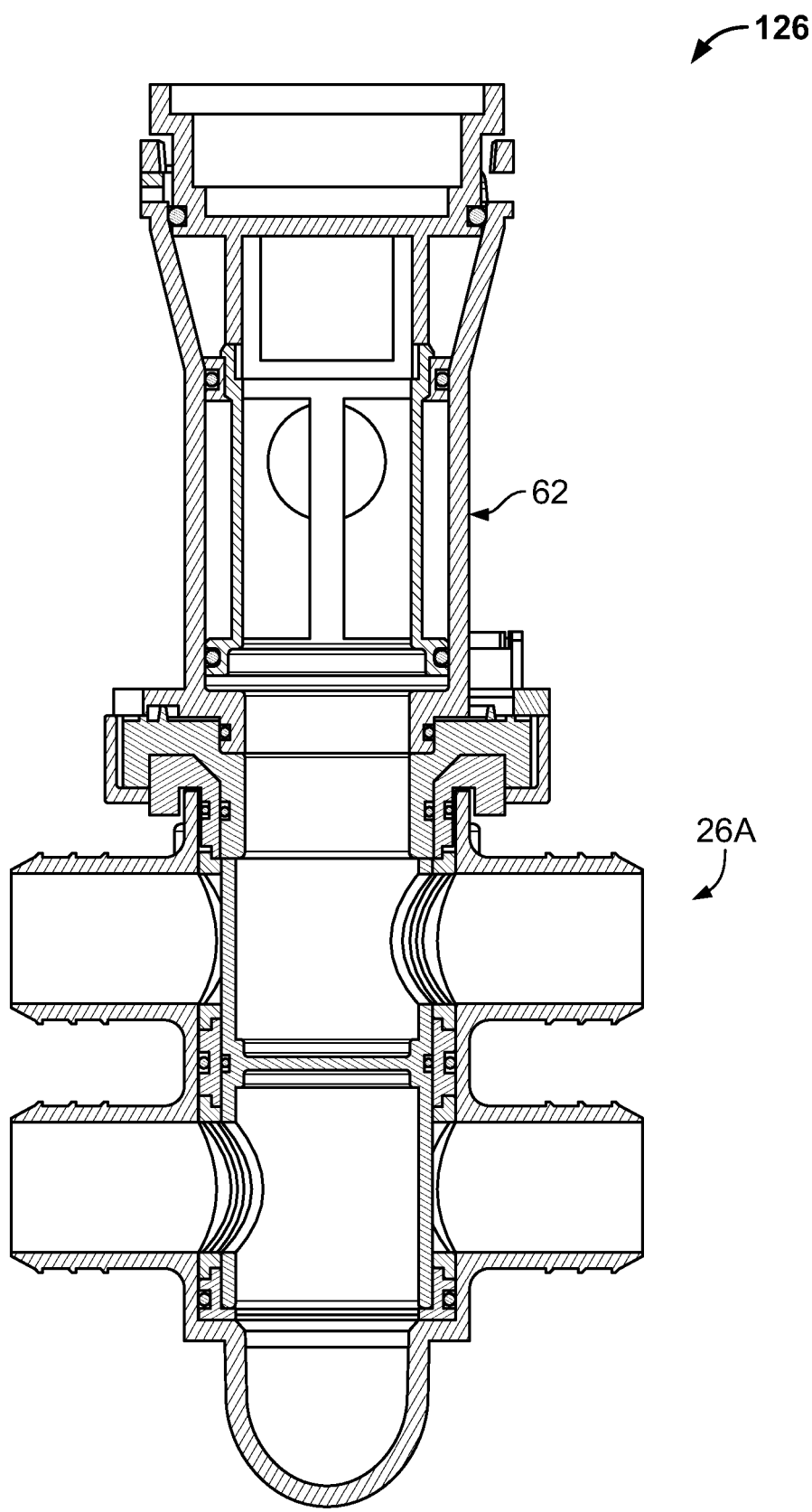
FIG. 11 is another view of the combination valve of FIG. 10, the combination valve shown integrated with a filter of the system.

Turning to FIGS. 10 and 11, the three-way valve 26A of the present teachings is further illustrated. In FIG. 11, the valve 26A is shown as part of a subassembly 126 that includes the filter 62.

It will now be appreciated that the system 10 of the present teachings is an intelligent structure of components (e.g. pumps, valves, sensors) that provides for real time monitoring and managing of wastewater within an RV. The system 10 thus provides a highly convenient and easy to use means for enabling a user to monitor the black water and grey water levels in the holding tanks of an RV, to conveniently empty the tanks 12 and 14 when needed. In particular, the system 10 eliminates the need for manual emptying of the black water tank by a Cassette® type system. With the system 10, the user may use a single drain hose, and simply empty the black water tank 12 and the grey water tank 14 through the black water tank 12 to rinse the system 10 clean. If a key fob or smartphone application is included, the user may even remotely start the emptying operation from a remote location where the end of a drain hose has been coupled to a remote sanitation/sewer hookup.

While various embodiments have been described, those skilled in the art will recognize modifications or variations which might be made without departing from the present disclosure. The examples illustrate the various embodiments and are not intended to limit the present disclosure. For example, while the various inventions described herein may have particular application for recreational vehicles, the present teachings may be readily adapted for other vehicles, including but not limited to those in the marine industry. Therefore, the description and claims should be interpreted liberally with only such limitation as is necessary in view of the pertinent prior art.

What is claimed is:

1. A vehicle wastewater management drainage system for draining a permanent wastewater holding tank of a vehicle, comprising:
 a housing including:
  a cylindrical outer wall defining an inlet chamber;
  an inner wall below the inlet chamber and extending from an inner surface of the cylindrical outer wall;
  an outlet passage extending through the inner wall; and
  an inlet for introducing wastewater into the inlet chamber;
 a valve capable of sealingly closing the outlet passage, the valve being disposed within the inlet chamber and being capable of axially moving therein;
 an outlet seat attached to the inner wall and encircling the outlet passage; and
 a valve activation mechanism including a plunger attached to the valve for axially moving the valve within the inlet chamber, and a user control member;
 wherein the valve activation mechanism is capable of moving the valve from a first position where the valve is spaced from the outlet seat and fluid may flow through the outlet passage, to a second position where the valve sealingly engages the outlet seat and fluid may not flow through the outlet passage.

2. The system of claim 1, wherein the housing is unitarily constructed of plastic.

3. The system of claim 1, wherein the outlet passage terminates short of a lowermost end of the cylindrical outer wall of the housing.

4. The system of claim 1, wherein the valve activation mechanism is an integrated part of a handgrip.

* * * * *